United States Patent [19]

Erickson

[11] Patent Number: 5,222,320

[45] Date of Patent: Jun. 29, 1993

[54] FISHING LURES PAINTED WITH THERMOCHROMIC PAINT

[76] Inventor: Nels E. Erickson, 805 W. 10th Street, Duluth, Minn. 55806

[21] Appl. No.: 850,038

[22] Filed: Mar. 12, 1992

[51] Int. Cl.$^5$ .............................................. A01K 85/00
[52] U.S. Cl. .................................................. 43/42.32
[58] Field of Search ........................................ 43/42.32

[56] References Cited

U.S. PATENT DOCUMENTS

| | | | |
|---|---|---|---|
| 2,854,780 | 10/1958 | Dege | 43/42.32 |
| 3,305,964 | 2/1967 | Wieszeck | 43/42.32 X |
| 4,524,539 | 6/1985 | Morris | 43/43.13 X |
| 4,787,167 | 11/1988 | Waoclawski | 43/42.32 X |
| 4,835,899 | 6/1989 | Hecton | 43/42.53 |
| 4,917,643 | 4/1990 | Hippely | 106/21 R |
| 5,096,451 | 3/1992 | Smith | 446/14 |

Primary Examiner—Richard K. Seidel
Assistant Examiner—Kenneth J. Hansen
Attorney, Agent, or Firm—John P. Halvonik

[57] ABSTRACT

The invention is a set of colored fishing lures which change their color depending on the temperature of the body of water they are in. The lures are painted with thermochromic inks or paints in a variety of black, white, chartreuse, orange, red, blue, purple, green, yellow, gold and pinks. The paint is water resistant, changes quickly within a few degrees of temperature, and is easy to apply.

3 Claims, 1 Drawing Sheet

FISHING LURES PAINTED WITH THERMOCHROMIC PAINT

FIELD OF INVENTION

1. Background of the Invention

The invention relates to the field of fishing lures and, in particular, to lures that are painted with thermochromic inks and/or paint, resulting in colored lures whose color is temperature dependent.

2. Description of the Prior Art

While color changing lures are mentioned in U.S. Pat. Nos. 4,835,899 and 4,731,948 to Doyle Helton, these do not mention coating lures with thermochromic ink or paint. These patents refer to liquid crystal which turns color in response to electromagnetic fields.

SUMMARY OF THE INVENTION

The invention is a fishing lure that is painted with thermochromic ink or paint to produce a lure that changes colors at different temperatures. The lures aid the fishing process as different lures can be chosen that change colors at different temperatures and thus different thermoclimes in the body of water being fished can be identified to determine where fish are most likely to be.

It is an object of the invention to provide a fishing lure that will change color upon reaching different temperatures, Another object of the invention is to provide a set of fishing lures with color changing characteristics of different temperatures to indicate at which thermoclimes, in the body of water being fished, the fish are located.

Yet another objective is to provide a fishing lure that changes color at a known temperature so that one can easily determine at which thermoclime fish are known to be biting.

Another objective is to provide a lure that changes color at certain temperatures that will not change back until a substantial drop in temperature due to the cold color/hot color system.

Still another objective of the invention is to provide a thermochromic lure that can be made easily and will be of reasonably long life.

Other objectives of the invention will become apparent to those skilled in the art once the the invention has been shown and described.

DESCRIPTION OF THE PREFERRED EMBODIMENT

Figure 1:
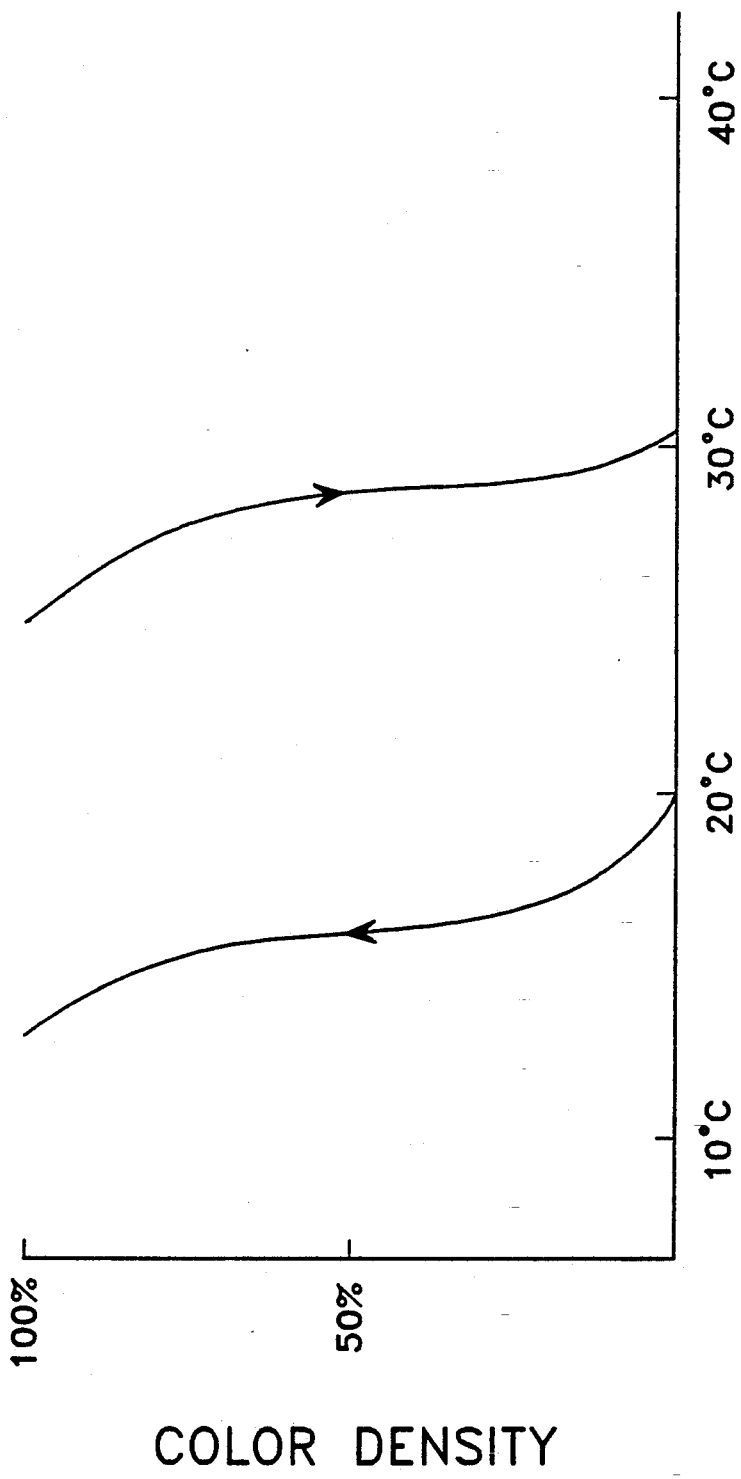
FIG. 1 shows a graph of color versus temperature for a cold color ink.

The terms "thermochromic ink" or "thermochromic paint" are used in this application to refer to special paints or dyes that change color when the surrounding temperature changes. These dyes are typically ester or alkyd based and are known as thermochromic paints or inks.

Matsui-Shikisco Chemical Co., Ltd. of Kyoto, Japan and Pilot, Inc. of 1800 Sarona Way, Carson, Calif. (parent company located in Naguya, Japan) are two known producers of such paints that may be used for the inventions in this application. Thermochromic paints are known by the tradename: CHROMICOLOR.

The preferred paint that has been found to work the best is known as Chromic Alkyd Electrostatic Paint and it is made by Matsui company.

Usually, a color-changing system uses two types of colored paint: "cold colors" and "hot colors". Hot colors underlie the top coat and do not change color with temperature. Cold colors overlie the hot color and do change color at certain temperatures, usually somewhere between 0 and 30 degrees celsius. Usually the cold color is of draker hue than the hot color and the color change that results when a certain temperature is reached results in a virtual disappearance of the "cold color" to reveal the color of the "hot color".

Typical base or hot colors are white, yellow, orange, blue, green and various shades in between. The cold colors overlie the base colors and the lure would normally be that color until the temperature rises to a certain point at which the top coat, cold color almost all disappears to reveal the base coat, hot color.

It is important to note that these cold colors usually have two crucial temperatures: a temperature at which the cold color vanishes as temperature rises and, once it has vanished, a temperature at which the cold color re-appears as the temperature drops. These two temperatures are not necessarily the same. See FIG. 1.

For instance, a cold color of yellow may disappear at 30° C. to reveal a blue base coat (hot color). Then, as the water (or outside atmosphere) lowers, the yellow cold color does not reappear until, say, 20° C. Hence the use of the term; "history" to describe these type of paints, i.e. the state that the color is in is important to determine what color it will be at a given temperature.

In the example above, at 25° C. the top coat cold color would be seen if the lure had been at a lower temperature. In that case, the cold color will disappear when it reaches 30° C. The top coat would not be seen at 25° if the lure was previously warmer (i.e. had already reached 30° and had disappeared). In that case the cold color will not return until 20° C. is reached. Thus at a given temperature, the previously reached state ("history") may determine what color shows.

FIG. 1 shows this phenomenon in graphical form with the arrows to indicate the direction of temperature fall or rise. The y axis indicates the percentage of cold color, top coat that appears at a given temperature.

Typical cold colors are yellow, orange, vermillion, rose, pink, magenta, blue, green and black. In the Matsui scheme, the cold colors cannot be of lighter shade than the base color, so when one chooses, say, blue for the base color the cold colors will be in the form of shades of purple.

As some varieties of fish, especially in ocean waters, do turn colors it is thought that some lures may be painted colors that resemble those that these fish turn into. It is possible that fish may be triggered into striking when they see a color change occur.

Depending on which type is chosen, the colors will turn upon reaching some temperature between 0 and 30 degrees celsius. In this scheme, various lures can be made which will turn at different temperatures, and an entire set of lures can be kept at hand in order to be prepared to fish at whatever thermoclime may be encountered. The term "thermoclime" refers to a certain level in the body of water that is at or near the same temperature. Fish are believed to generally feed at or otherwise inhabit one thermoclime at any one time depending on the time of day and what activity they are at, e.g. feeding, etc.

With the set of lures of different temperature dependence in hand, one goes fishing and chooses a lure that turns at a temperature near that of the thermoclime that the fish are at. Different lures are used until it is found which lure seems to be getting the most action. The temperature that lure changes at indicates the thermoclime in the water that is likely to have the most fish. With these types of cold colors in use, it does not matter if the thermoclime temperature lowers a few degrees, the cold color will not change back until a sizeable drop in temperature is realized.

The paint may be applied like other types of paints, first a base coat is applied which is a primer, typically white. Then, a main coat is applied, the desired hot color (the color that will be seen when the cold color disappears as the temperature rises). Finally, the top coat is applied which may be the cold color. After each spray, air dry, then bake at 130°-140° for a minimum of 12 minutes, If baking at 140°, the total baking time should not exceed 80 minutes. The chromic (color-changing) ink should be continuously stirred during use to prevent settling.

Typical colors that may be chosen for hot colors would likely be black, white chartreuse, orange, red, blue, purple, green, yellow, gold, and pink.

I claim:

1. An improved fishing lure for fishing at varied thermoclimes in the water comprising: fishing lure having a thermochromic coating of a first particular color, said coating having a memory characteristic such that said first color changes to a lighter shade at a certain first temperature and changes back to said first particular color upon reaching a second temperature lower than said first temperature.

2. A set of fishing lures comprising a plurality of fishing lures coated with a cold color thermochromic paint, said thermochromic paint having a memory characteristic such that said cold color changes to a lighter shade at a certain first temperature and changes back to said cold color upon reaching a second temperature lower than said first temperature.

3. An improved fishing lure for fishing at varied thermoclimes in the water comprising: fishing lure having a two layer, colored coating comprising a bottom layer and a top layer, said bottom layer comprising a hot color thermochromic ink, said top layer comprising a cold color thermochromic ink, said cold color of darker shade than said hot color and having a memory characteristic such that said cold color changes to a lighter shade at a certain first temperature and changes back to said cold color upon reaching a second temperature lower than said first temperature.

* * * * *